(12) United States Patent
Hecker et al.

(10) Patent No.: US 12,447,940 B2
(45) Date of Patent: Oct. 21, 2025

(54) ELECTRONICALLY CONTROLLED OPERATING BRAKE SYSTEM HAVING BACKUP CONTROL PRESSURE GENERATED ON A BASIS OF AN ADDITIONAL COMPRESSED AIR CONSUMER CIRCUIT

(71) Applicant: KNORR-BREMSE Systeme für Nutzfahrzeuge GmbH, Munich (DE)

(72) Inventors: Falk Hecker, Markgroeningen (DE); Oliver Jundt, Hessigheim (DE); Friedbert Roether, Cleebronn (DE)

(73) Assignee: KNORR-BREMSE Systeme for Nutzfahrzeuge GmbH, Munich (DE)

( * ) Notice: Subject to any disclaimer, the term of this patent is extended or adjusted under 35 U.S.C. 154(b) by 556 days.

(21) Appl. No.: 17/948,687

(22) Filed: Sep. 20, 2022

(65) Prior Publication Data

US 2023/0108493 A1    Apr. 6, 2023

Related U.S. Application Data

(63) Continuation of application No. PCT/EP2021/055075, filed on Mar. 1, 2021.

(30) Foreign Application Priority Data

Mar. 24, 2020 (DE) .................. 102020108072.7

(51) Int. Cl.
 *B60T 13/68* (2006.01)
 *B60T 15/02* (2006.01)

(52) U.S. Cl.
 CPC .......... *B60T 13/683* (2013.01); *B60T 15/027* (2013.01); *B60T 2270/402* (2013.01)

(58) Field of Classification Search
 CPC ................. B60T 13/683; B60T 15/027; B60T 2270/402; B60T 13/66; B60T 8/1708; B60T 13/24; B60T 15/18
 See application file for complete search history.

(56) References Cited

U.S. PATENT DOCUMENTS

| 7,866,761 B2* | 1/2011 | Gerum ..................... B60T 8/321 |
| | | 303/127 |
| 10,730,499 B2* | 8/2020 | Otremba ............... B60T 13/662 |
| 2020/0070795 A1* | 3/2020 | Van Thiel ............. B60T 13/662 |

FOREIGN PATENT DOCUMENTS

| DE | 3230970 C2 | 2/1989 |
| DE | 19653264 A1 | 6/1998 |
| DE | 10320608 A1 | 12/2004 |

(Continued)

OTHER PUBLICATIONS

German Patent No. DE 102010012498 to Hecker et al. published on Jan. 26, 2012.*

(Continued)

*Primary Examiner* — Pamela Rodriguez
(74) *Attorney, Agent, or Firm* — Von Rohrscheidt Patents

(57) ABSTRACT

An electronically controlled pneumatic operating brake system, having a backup control pressure for a pneumatic fall back level, wherein the backup control pressure is generated from a compressed air supply which is independent from two compressed air supplies for a front axle circuit and a rear axle circuit. This assures additional pneumatic redundancy and facilitates omitting a pneumatic channel in a foot brake module.

21 Claims, 4 Drawing Sheets

(56) References Cited

FOREIGN PATENT DOCUMENTS

| DE | 102007038288 | 2/2009 |
|---|---|---|
| EP | 3344503 B1 | 4/2019 |
| GB | 2125915 | 3/1984 |
| WO | WO2009152982 A2 | 12/2009 |
| WO | WO2018172268 A1 | 9/2018 |

OTHER PUBLICATIONS

German Patent No. DE 102017113336 to Hecker et al.published on Dec. 20, 2018.*
WO document No. WO 2019/210956 to Farres et al.published on Nov. 7, 2019.*
European Patent No. EP 4269193 to Jundt et al.published on Nov. 1, 2023.*

* cited by examiner

ELECTRONICALLY CONTROLLED OPERATING BRAKE SYSTEM HAVING BACKUP CONTROL PRESSURE GENERATED ON A BASIS OF AN ADDITIONAL COMPRESSED AIR CONSUMER CIRCUIT

RELATED APPLICATIONS

This application is a continuation of International Patent Application PCT/EP2021/055075 filed on Mar. 1, 2021, claiming priority from German Patent Application DE10 2020 108 072.7 filed on Mar. 24, 2020, both of which are incorporated in their entirety by this reference.

FIELD OF THE INVENTION

The invention relates to an electronically controlled pneumatic operating brake system.

BACKGROUND OF THE INVENTION

A generic electronically controlled pneumatic operating brake system is known from EP 3 344 503 B1. In the known brake system, a first brake valve configured as a foot brake valve including an electrical channel and two pneumatic channels is supplied with compressed air through a first compressed air supply and a second brake valve configured as a 2-channel pressure regulation module is supplied with compressed air through a second compressed air supply. The foot brake valve generates first brake valve control pressures for a first control valve at a front axle and for a second control valve at a rear axle as a function of an actuation of the foot brake pedal of the first brake valve in both its pneumatic channels. Second brake valve control pressures for the first control valve at the front axle and for the second control valve at the rear axle are generated in parallel for redundancy purposes by the second brake valve in both its two channels. Thus, either a greater control pressure of the two first brake valve control pressure and the second brake valve control pressure or a sum of both is put out to the first control valve and the second control valve. This configuration provides electrical and pneumatic redundancy, however, fabrication and assembly complexity are comparatively large.

BRIEF SUMMARY OF THE INVENTION

It is an object of the invention to improve an electronically controlled pneumatic operating brake system so that redundancy is achieved with low fabrication and assembly complexity.

The object is achieved by an electronically controlled pneumatic operating brake system, comprising:
a) a first electronic control (EBS-ECU);
b) a first brake circuit including a first compressed air supply (C1) and a first control valve (1C-EPM);
c) a second brake circuit including a second compressed air supply (C2) independent from the first compressed air supply (C1) and a second control valve (2C-EPM), wherein the first brake circuit is supplied with compressed air from the first compressed air supply (C1) and the second brake circuit is supplied with compressed air from the second compressed air supply (C2);
d) wherein at least a first brake pressure is controllable by the first control valve (1C-EPM) at least at one first pneumatic operating output of the first control valve (1C-EPM) in the first brake circuit based on compressed air from the first compressed air supply (C1), and at least one second brake pressure is controllable by the second control valve (2C-EPM) at least at one second pneumatic operating output of the second control valve (2C-EPM) in the second brake circuit based on compressed air from the second compressed air supply (C2), wherein at least one pneumatic operating brake actuator of the first brake circuit is connected at the at least one first pneumatic operating output and at least one pneumatic operating brake actuator of the second brake circuit is connected at the at least one second pneumatic operating output,
e) wherein the first control valve (1C-EPM) includes a first electrical control input configured to receive a first electrical control signal and a first pneumatic control input configured to receive a first pneumatic control pressure and the second control valve (2C-EPM) includes a second electrical control input configured to receive a second electrical control signal and a second pneumatic control input configured to receive a second pneumatic control pressure,
f) wherein the first electronic control (EBS-ECU) generates the first electrical control signal as a function of a nominal vehicle deceleration and feeds the first electrical control signal to the first electrical control input of the first control valve (1C-EPM) and generates the second electrical control signal and feeds the second electrical control signal into the second electrical control input of the second control valve,
g) wherein control signal generation devices are provided that generate the first pneumatic control pressure as a function of the nominal vehicle deceleration and feed the first pneumatic control pressure to the first pneumatic control input of the first control valve and generate the second pneumatic control pressure and feed the second pneumatic control pressure to the second pneumatic control input of the second control valve.

The control signal generation devices can be configured pneumatically-mechanically actuatable or pneumatically—electrically actuatable.

The invention furthermore provides that
h) at least one third compressed air consumer circuit is provided that is independent from the first brake circuit and the second brake circuit and supplied with compressed air by at least one third compressed air supply (C3) that is independent from the first compressed air supply (C1) and the second compressed air supply (C2),
i) wherein a pneumatic supply connection of the control signal generation devices
i1) is supplied with compressed air from a greater supply pressure of a first supply pressure in the first compressed air supply (C1) and a second supply pressure in the second compressed air supply (C2), or
i2) is supplied with compressed air by a third supply pressure of the third compressed air supply (C3),
j) wherein the control signal generation devices are configured to generate the first pneumatic control pressure and feed the first pneumatic control pressure to the first pneumatic control input and generate the second pneumatic control pressure and feed the second pneumatic control pressure to the second pneumatic control input based on the first supply pressure, the second supply pressure or the third supply pressure provided to the supply connection.

When supplying compressed air to a pneumatic operating brake system typically a multi circuit safety valve is used that has separate circuits that provide supply pressures to the compressed air consumer circuits like e.g. the first brake circuit, the second brake circuit and the third compressed air consumer circuit from compressed air fed by a compressor. Consequently, a leak in one of the compressed air supplies or in one compressed air consumer circuit does not influence functioning compressed air consumer circuits.

Thus, the invention makes use of an independence of the compressed air supplies or the compressed air consumer circuits in order to provide an economical configuration of secondary pneumatic or electro pneumatic redundant brake circuits which provide redundancy for the primary electro pneumatic operating brake circuit.

Since a third compressed air supply is typically provided for secondary consumers like e.g. a pneumatic air suspension or a pneumatic parking brake circuit in commercial vehicles with an electronically controlled operating brake system, the invention advantageously uses compressed air devices that are provided on the commercial vehicle.

Thus, a pneumatic channel of a foot brake module which typically has two pneumatic channels can be omitted according to an advantageous embodiment because the first pneumatic control pressure and the second pneumatic control pressure are used as a common pneumatic control pressure for both control valves, wherein the single pneumatic channel is then supplied with compressed air, either by the third compressed air supply or by the first compressed air supply or by the second compressed air supply.

Thus in the first case, if the first compressed air supply and/or the second compressed air supply or the associated pneumatic supply conduits have a leak, a common pneumatic control pressure for the two control valves is generated based on the third supply pressure of the third compressed air supply in the single pneumatic channel of the foot brake module.

Thus, in the second case if the first compressed air supply or the second compressed air supply or the associated pneumatic supply conduits have a leak, the common pneumatic pressure for the two control valves is then generated based on the first or second supply pressure of the functioning first or second compressed air supply in the single pneumatic channel of the foot brake module.

Thus, a common pneumatic control pressure for both control valves indicates that the first pneumatic control pressure and the second pneumatic control pressure essentially have an identical pressure value.

The measures recited supra provide redundancies with respect to compressed air supply when generating the common pneumatic control pressure and provide an opportunity to save a pneumatic channel in the foot brake module including pneumatic plumbing.

In these embodiments that include a foot brake module with an advantageously single pneumatic channel the control signal generation devices are configured as the advantageously single pneumatic channel of the foot brake module and are then pneumatically and mechanically actuated by the foot brake pedal.

According to other advantageous embodiments the common pneumatic control pressure for the two control valves is generated by electro pneumatic single generation devices that include a second electronic control and a magnet valve device controlled by the second electronic control wherein the magnet valve device is supplied with compressed air at the supply connection either from the first compressed air supply or the second compressed air supply or from the third compressed air supply which provides redundancy with respect to compressed air supply.

The second electronic control like the first electronic control is advantageously configured as an electronic brake control so that the second electronic control provides electronic redundancy with respect to electronic control and/or regulation of the operating brake system.

Thus, the second electronic control can be controlled as a function of a second electronic brake request signal which is either generated in a second electrical channel of the foot brake module as a function of an actuation of the foot brake pedal or which is generated in particular automatically by a driver assist system e.g. an emergency brake assistant or an autopilot device.

The dependent claims provide advantageous embodiments of the invention defined in claim 1.

Advantageously the nominal vehicle deceleration can be predetermined by actuating a foot brake pedal of the foot brake module or by an autopilot device or by a driver assist system. Thus, an actuation of the foot brake pedal of the foot brake module or a driver assist system or an autopilot device can respectively predetermine a value for the nominal vehicle deceleration and thereafter a respectively greater value can be used for generating the first electrical control signal, the second electrical control signal, the first pneumatic control pressure and the second pneumatic control pressure.

Advantageously selection devices are provided that respectively control the greater pressure between the first supply pressure and the second supply pressure to the supply connection of the pneumatic control signal generation devices. The selection devices advantageously include a pneumatic switch valve that connects a first input connection to the first compressed air supply and a second input connection to the second compressed air supply and that connects an output connection to the supply connection of the pneumatic control signal generation devices.

The foot brake module (FBM) includes at least one electrical channel for generating an electrical brake request signal as a function of an actuation of the foot brake module. Additionally, at least one pneumatic channel can be provided configured to generate a pneumatic control pressure as a function of the actuation of the foot brake module. Advantageously the foot brake module (FBM) includes only a single pneumatic channel in which the common pneumatic control pressure for the first control valve and the second control valve is generated as a function of the actuation of the foot brake module.

Thus, the foot brake module (FBM) can include a first electrical channel in which a first electrical brake request signal is generated as a function of the actuation of the foot brake pedal and fed to the first electronic control (EBS-ECU) which generates the first electrical control signal as a function of the first brake request signal and feeds the first electrical control signal to the first electrical control input and generates the second electrical control signal and feeds the second electrical control signal to the second electrical control input.

As recited supra the foot brake module (FBM) can include at least one pneumatic channel, in particular only one pneumatic channel that is included in the control signal generation devices and supplied with compressed air by the supply connection and that generates the first pneumatic control pressure as a function of the actuation of the foot brake pedal and that feeds the first pneumatic control pressure to the first pneumatic control input and that generates the second pneumatic control pressure and feeds the second pneumatic control pressure to the second pneumatic control input. When there is only a single pneumatic channel the entire common pneumatic control pressure for the first control valve and the second control valve is generated in the single pneumatic channel.

The foot brake module (FBM) can also include a second electrical channel that generates a second electrical brake request signal as a function of an actuation of the foot brake pedal.

Additionally or alternatively the autopilot device or the driver assist system can generate the first electrical brake request signal as a function of the nominal vehicle deceleration and feed the first electrical brake request signal to the first electronic control (EBS-ECU) which generates the first electrical control signal as a function of the first brake request signal and feeds the first electronic control signal to the first electrical control input and generates the second electrical control signal and feeds the second electrical control signal to the second electrical control input and the auto pilot or the driver assist system can also generate the second electrical brake request signal as a function of the nominal vehicle deceleration and feed the second electrical brake request system to the second electronic control (EBS-ECU-redundant).

Thus, the second electrical brake request signal can be generated and predetermined by the second electrical channel of the foot brake module and/or by the auto pilot device and/or by the driver assist system as a function of the nominal vehicle deceleration.

According to an advantageous embodiment the signal generation devices can include a magnet valve device and a second electronic control (EBS-ECU-redundant) which generates a third electrical control signal as a function of an electrical brake request signal or the second brake request signal and feeds the third electrical control signal to the magnet valve device which generate the first pneumatic control pressure as a function of the third electrical control signal and feeds the first pneumatic control pressure into the first pneumatic control input and generates the second pneumatic control pressure and feeds the second pneumatic control pressure to the second pneumatic control input.

Thus, the first electronic control (EBS-ECU) can be supplied with electrical energy by a first electrical power supply and the second electronic control (EBS-ECU-redundant) and the magnet valve device can be supplied with electrical energy by a second electrical power supply which is independent from the first electrical power supply.

Thus, the second electronic control (EBS-ECU-redundant) can form redundancy for the first electronic control (EBS-ECU) when the first electronic control (EBS-ECU) or an electrical energy supply of the first electronic control (EBS-ECU) has malfunctioned or failed so that the at least one first brake pressure is generated based on the first pneumatic control pressure and the at least one second brake pressure is generated based on the second e pneumatic control pressure.

In particular the first electronic control (EBS-ECU) is supplied with electrical energy by a first electrical energy source (e.g. battery, accumulator) which is independent from a second electrical energy source e.g.: (e.g. battery accumulator). In particular the first electronic control (EBS-ECU) and the first electrical channel of the foot brake module can be supplied with electrical energy by the first electrical power supply and the second electronic control (EBS-ECU-redundant), the magnet valve device and the second electrical channel of the foot brake module (FBM) can be supplied with electrical energy by the second electrical power supply. The two electrical energy sources can be connected to an onboard power grid of the commercial vehicle.

In particular the magnet valve device is supplied with compressed air by the supply connection of the signal generation devices and includes an inlet-/outlet magnet valve combination for increasing, maintaining and reducing the first pneumatic control pressure and the second pneumatic control pressure as a function of the third electrical control signal. The inlet-/outlet magnet valve combination can include in particular two 2-way magnetic valves, an inlet magnet valve and an outlet magnet valve respectively including a blocking position and a pass-through position wherein the outlet valve includes a bleed air connection.

Advantageously the signal generation devices can include at least one pressure sensor that reports an actual pressure value controlled by the magnet valve device and/or a second pneumatic control pressure controlled by the magnet valve device to the second electronic control (EBS-ECU-redundant) that regulates the magnet valve device in a closed control loop so that the actual pressure value is regulated to match a nominal pressure value that is a function of the second electrical brake request signal.

Thus, the instant subsequent electro pneumatic redundancy is configured to implement a common regulation of the brake pressure for both brake circuits.

The signal generation devices can be configured to feed the first pneumatic control pressure and/or the second pneumatic control pressure into a pneumatic control input of an electro pneumatic trailer control module (TCM) in order to control the brakes of a trailer, wherein the trailer control module (TCM) is in particular primarily electrically controlled by electrical control signals of the first electronic control (EBS-ECU). Then the first pneumatic control pressure and/or the second pneumatic control pressure or the common pneumatic control pressure provide a pneumatic redundancy for controlling the trailer brakes.

In particular the first control signal can represent a first nominal value for the first brake pressure and the second electrical control signal can represent a second nominal value for the second brake pressure. Thus, a proprietary independent nominal value can be predetermined independently for the brake pressure in each brake circuit. When the first brake circuit is a front axle brake circuit and the second brake circuit is a rear axle brake circuit, a different nominal value can be predetermined in each brake circuit wherein the nominal value is a function of e.g. of an axle weight distribution of the vehicle.

Actual values for the brake pressure or for the brake pressures are advantageously regulated by one channel or multi-channel pressure regulation modules to achieve the at least one predetermined nominal value for the brake pressure. Thus, an independent control can be performed e.g. as a function of brake slippage in each channel, wherein the brake pressure for a wheel brake of the right wheel can be separately controlled in one channel and the brake pressure of the left wheel can be separately controlled in another channel when a two-channel pressure regulation module is associated with an axle. The regulation of the brake pressure can be jointly performed when a one channel pressure regulation module is associated with an axle wherein a respectively ABS pressure control valve (PCV) can be arranged between the one channel pressure regulation module and the pneumatic brake cylinders on the right and on the left in order to be able to control the brake pressure on each side according to brake slippage.

Advantageously the first control valve (1C-EPM) and/or the second control valve (2C-EPM) is formed at least by or includes at least the following: a one channel pressure regulation module or a two-channel pressure regulation module.

For each channel a pressure regulation module that is configured as a unit can include the following: a relay valve, an inlet-/outlet magnet valve combination which pneumatically pilot controls the relay valve, an electronic control unit that is connected to the first or second electrical control input wherein the electronic control unit electrically controls the inlet-/outlet valve magnet combination as a function of the electronic control signal fed to the first or second electrical control input in order to generate a pneumatic pilot pressure for the relay valve, wherein the relay valve generates an actual value for the first or second brake pressure as a function of the pneumatic pilot pressure. Furthermore, a pressure sensor can be integrated into the pressure control module wherein the pressure sensor reports the actual value of the brake pressure to the at least one electronic control unit so that the electronic control unit electrically controls the inlet-/outlet valve magnet combination in order to adjust the actual value to the nominal value for the brake pressure. The routines for the brake pressure regulation are implemented in the electronic control unit. Advantageously a backup valve electrically controlled by the electronic control unit and advantageously implemented as two-way magnet valve is integrated in the pressure regulation module which provides a connection between the first or second pneumatic control input and the first or second operating output so that the corresponding first or second control pressure can pass the pressure regulation module in a redundancy situation, this means when the primary electro-pneumatic brake circuit has failed so that the corresponding first or second control pressure can be fed to the pneumatic operating brake cylinders. On the other hand, side when the backup valve is provided with electrical current, this means when the electromagnetic brake circuit is functional, the backup valve goes into its blocking position and blocks the connection.

The pressure regulation modules and optionally also the ABS pressure control valves can be integrated in an electronically controlled brake system including brake pressure regulation (EBS) which includes at least the first electronic control (EBS brake control unit) and the foot brake module. The pressure regulation modules include supply inputs that are supplied with compressed air by the respective compressed air supply and that modulate the brake pressure in the respective channel based on the respective supply pressure.

As stated supra, the first brake circuit can be a front axle brake circuit and the second brake circuit can be a rear axle brake circuit. Thus, a one channel pressure control module can be arranged at the front axle and a two-channel pressure control module can be arranged at the rear axle.

Thus, e.g. two first operating outputs (right-left) of the first control valve which is formed e.g. by a one-channel pressure control module can be connected respectively with a first pneumatic operating brake cylinder (right-left) and two second operating outputs (right-left) of the second control valve (2C-EPM) which is formed e.g. by a two-channel pressure control module can be connected respectively with a second pneumatic operating brake cylinder.

As stated supra, the third compressed air consumer circuit can be a secondary consumer circuit which includes e.g. an electro pneumatic air suspension device or also a trailer brake circuit which supplies the trailer control module and a coupling head "supply" with compressed air. The trailer control module modulates the trailer brake pressure for the coupling head "brake" based on the third supply pressure in the third compressed air supply of the third compressed air consumer circuit. Alternatively, the trailer control module and the coupling head "storage" can also be supplied with compressed air by the first compressed air supply and the second compressed air supply.

The control signal generation devices are configured e.g. so that they generate and put out the first pneumatic control pressure and the second pneumatic control pressure as a common control pressure for the first brake circuit and for the second brake circuit.

BRIEF DESCRIPTION OF THE DRAWINGS

The invention is now described based on advantageous embodiments with reference to drawing figures, wherein.

DETAILED DESCRIPTION OF THE INVENTION

Figure 1:
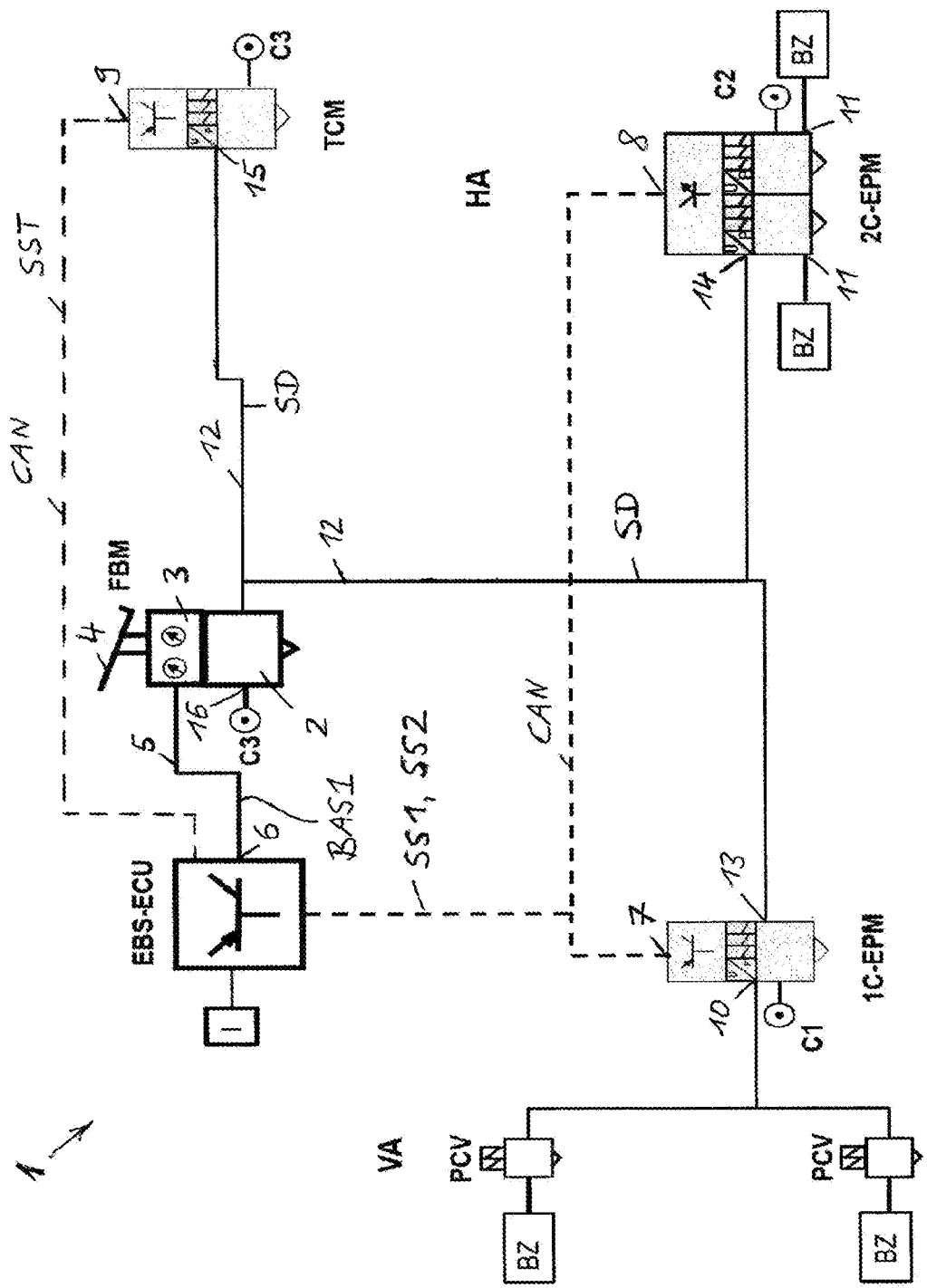
FIG. 1 illustrates a schematic diagram of an electronically controlled pneumatic operating brake system of a commercial vehicle according to a first embodiment of the invention.

FIG. 1 shows a first embodiment of an electronically controlled pneumatic operating brake system of a commercial vehicle which includes in particular an electronically controlled operating brake system with brake pressure regulation (EBS)

The EBS includes a front axle brake circuit configured as a first operating brake circuit and a rear axle brake circuit configured as a second operating brake circuit. The EBS furthermore includes a foot brake module (FBM) which, however, does not have a pneumatic channel for each brake circuit as usual, but only includes a single pneumatic channel 2 for both operating brake circuits which is operated by a foot brake valve as usual. Furthermore, the foot brake module (FBM) also includes a first electrical channel 3 including at least one electrical brake value encoder which measures pedal travel or pedal angle through a travel or angle measurement system wherein the foot brake valve as well as the electrical brake value encoder are actuated by a foot brake pedal 4. The electrical brake value encoder then generates a first electrical brake request signal BAS 1 as a function of an actuation of the foot brake pedal 4 and the pneumatic channel 2 generates a common pneumatic control pressure SD for the front axle brake circuit and the rear axle brake circuit. Through the respective actuation of the foot brake pedal 4 the driver predetermines a desired nominal vehicle deceleration.

Thereafter the first electrical brake request signal BAS1 is fed through a signal conductor 5 into a first electrical input 6 of a first electronic control EBS-ECU which is formed in this embodiment e.g. by a central EBS control unit of the EBS.

In the EBS-ECU routines are implemented which generate a first electrical control signal SS1 for the front axle brake circuit, a second electrical control signal SS2 for the rear axle brake circuit and electrical control signal SST for a trailer brake circuit, wherein the electrical control signals SS1, SS2 and SST respectively represent nominal values for the respective brake pressure in the front axle brake circuit, in the rear axle brake circuit and in a trailer brake circuit. The nominal values can thus be different e.g. as a function of an axle load distribution that is determined in the commercial vehicle.

The electrical control signals SS1, SS2 and SST are then fed by the EBS-ECU e.g. to a brake-CAN which is connected to a one channel pressure regulation module 1C-EPM with a first electrical control input 7 arranged at the front axle, a two-channel pressure control module 2C-EPM with a second electrical control input 8 arranged at the rear axle and a trailer control module TCM including a third electrical control input 9 all of which have already been described supra.

The trailer control module TCM is configured like a pressure regulation module and has e.g. one channel. The trailer control module in this embodiment also includes e.g. a proper electronic control unit. This electronic control unit controls its integrated magnet valves as a function of a trailer control signal SST that is provided at its third electrical control input 9 in order to generate a pneumatic control pressure for the integrated relay valve that puts out a corresponding trailer brake pressure at a coupling head "brake".

The one channel pressure regulation module 1C-EPM of the front axle is then connected at a supply side at a first front axle compressed air supply C1 that is provided at a first supply pressure. The two-channel pressure regulation module arranged at the rear axle is connected at a supply side to a second rear axle compressed air supply C2 that is provided with a second supply pressure. The trailer control module TCM is supplied with compressed air e.g. from a third compressed air supply C3.

As described supra the electronic control units integrated in both pressure control modules 1C-EPM and 2C-EPM and in the trailer control module TCM transpose information included in electrical control signals SS1, SS2 and SST regarding a respective nominal value for the operating pressure by controlling the respectively integrated magnet valves for each channel to generate pneumatic control pressures for the integrated relay valves which then put out an actual value for the first operating pressure at the front axle at a first pneumatic operating output 10 at the one channel pressure regulation module 1C-EPM of the front axle. The first pneumatic operating output 10 of the one channel pressure control module 1C-EPM is connected with two ABS pressure control valves PCV, which provide brake skid control per side (ABS function) for the initially common operating brake pressure that is put out controlled by the EBS-ECU before the operating brake pressure is fed to the pneumatic operating brake cylinders BZ of the front axle.

In the same manner, the two-channel pressure control module 2C-EPM controls an actual value of a second operating brake pressure at one of the two second pneumatic operating outputs 11 at the rear axle per channel. The two second pneumatic operating outputs are respectively connected at a pneumatic operating brake cylinder BZ of the rear axle. The integrated pressure sensor provided per channel then reports the actual value to the respective integrated control unit which then regulates the actual value to the nominal value by electrically controlling the integrated magnet valves. The integrated electronic control unit then also includes ABS routines that regulate the operating brake pressure per side to achieve proper brake skid.

In the same manner a trailer brake pressure is put out to the coupling head "brake" in the trailer control module TCM as a function of the electrical trailer control signal SST and measured by the integrated pressure sensor and then regulated to the nominal value by the integrated electronic control unit.

The EBS-ECU, the first electrical channel 3 of the foot brake module FBM, the trailer control module TOM and the pressure control modules 1C-EPM, 2C-EPM are supplied with electrical energy by a first electrical energy supply I, e.g. a battery connected to the electrical system of the vehicle.

The functions described supra relate to the electro pneumatic control when all electrical and electronic components of the two operating brake circuits and of the trailer brake circuit like e.g. the first electrical channel 3 of the foot brake module FBM, the first electrical power supply I, the EBS-ECU and the electronic control units, magnet valves and pressure sensors integrated in the pressure control modules 1C-EPM, 2C-EPM and in the trailer control module TOM are intact.

In a secondary pneumatic control of the two operating brake circuits the pneumatic channel 2 of the foot brake module FBM puts out a common pneumatic control pressure SD for the front axle brake circuit and the rear axle brake circuit into a pneumatic conduit 12 which is connected with a first pneumatic control input 13 of the one channel pressure control module and a second pneumatic control input 14 of the two-channel pressure control module 2C-EPM at the rear axle as described supra. Furthermore, the pneumatic conduit 12 is also connected to a third pneumatic control input 15 of the trailer control module TOM.

Since the pneumatic channel 2 of the foot brake module FBM is connected with a supply connection 16 at a third compressed air supply C3 of a third compressed air consumer circuit, the common pneumatic control pressure SD for the one channel pressure regulation module 1C-EPM and the 2-channel pressure regulation module 2C-EPM is derived from a third supply pressure in the third compressed air supply C3.

The first, second and third compressed air supply C1, C2 and C3 are filled with compressed air generated by a compressor through a multi-circuit safety valve wherein the respective air circuits are separate and thus independent from each other.

When the primary electro-pneumatic control of the electronic operating system 1 fails, e.g. by at least one electrical/electronic component failing, like e.g. the first electrical energy supply I, the first electrical channel 3 of the foot brake module, the EBS-ECU and/or the electronic control units and/or magnet valves integrated in the pressure regulation modules 1C-ECM, 2C-ECM or in the trailer control module TCM, the secondary pneumatic control of the operating brake system 1 provides pneumatic redundancy.

Put differently, the backup magnet valves that are without electrical current now in the pressure control modules 1C-DRM, 2C-DRM and in the trailer control module TCM, switch from a blocking position in which the common pneumatic control pressure SD is blocked from a pneumatic control input of the respective integrated relay valve into a pass through position of the backup magnet valves by spring loading since they are without electrical power now, so that the common pneumatic control pressure SD now controls the respective relay valve, so that the respective relay valve modulates the first and second operating brake pressure and the trailer brake pressure from the respectively connected first, second or third compressed air supply C1, C2, or C3 and then conducts the brake pressures to the respective pneumatic operating brake cylinders BZ or to the coupling head "brake".

An additional pneumatic redundancy for the operating brake system 1 comes from the supply connection 16 of the pneumatic channel 2 of the foot brake module FBM being supplied with compressed air from the third compressed air supply C3 that is independent from the first compressed air supply C1 and the second compressed air supply C2.

However, when the primary electronic control of the operating brake system has failed and additionally the first compressed air supply C1 and/or the second compressed air supply C2 or a supply conduit run from the compressed air supply C1 or C2 or from these compressed air supplies C1, C2 to the compressed air supply components FBM, 1C-EPM, 2C-EPM has a leak, pneumatically controlling a component effected by the loss of compressed supply air would not be possible anymore. However, since the pneumatic channel 2 of the foot brake module FBM is supplied with compressed air from the third compressed air supply C3, this loss of compressed air does not affect the redundant pneumatic control in particular the function of the trailer brakes is unimpaired by the loss of compressed air since the trailer control module TCM is supplied by the third compressed air supply C3.

Figure 2:
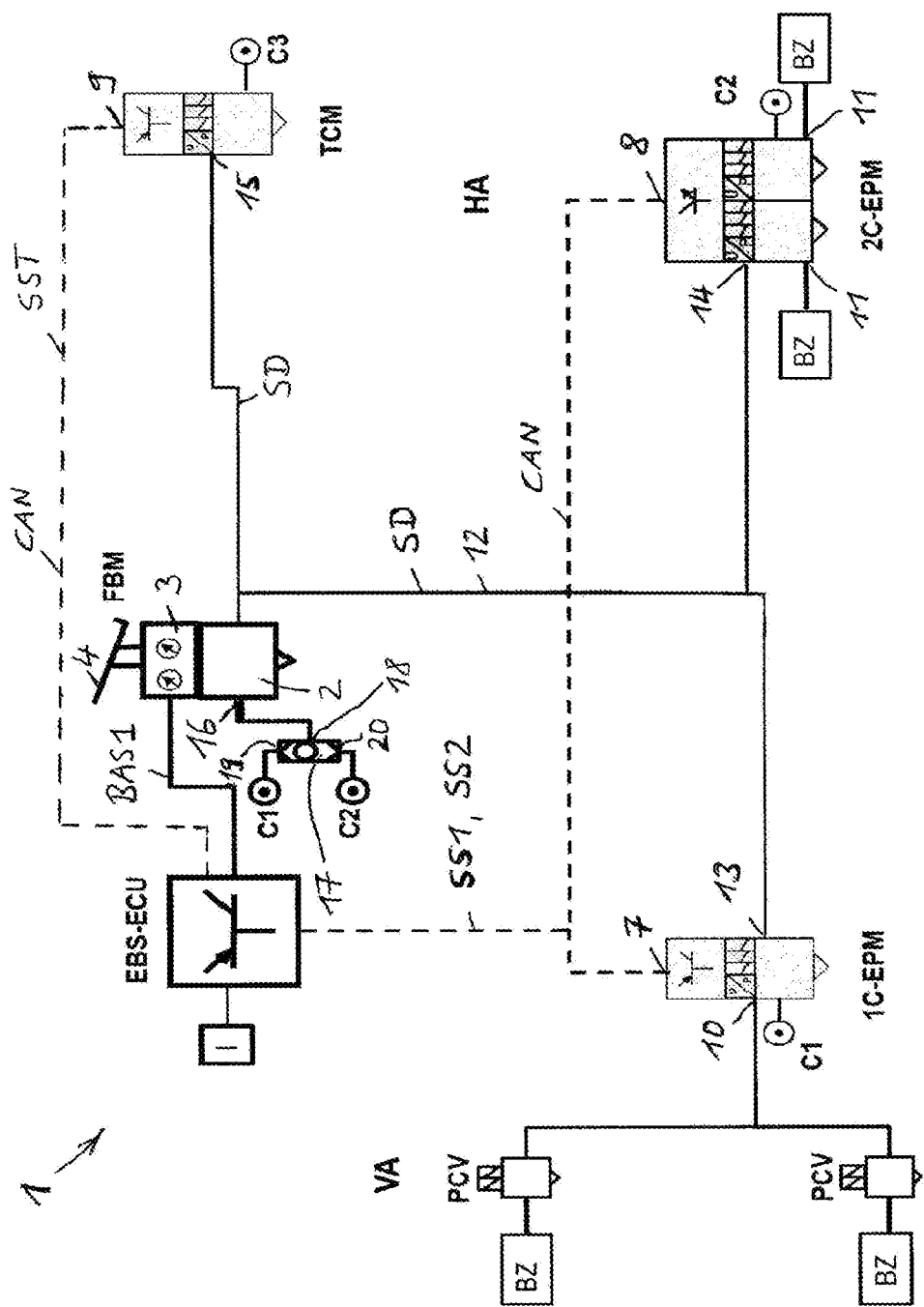
FIG. 2 illustrates a schematic diagram of an electronically controlled pneumatic brake system of a commercial vehicle according to a second embodiment of the invention.
Figure 3:
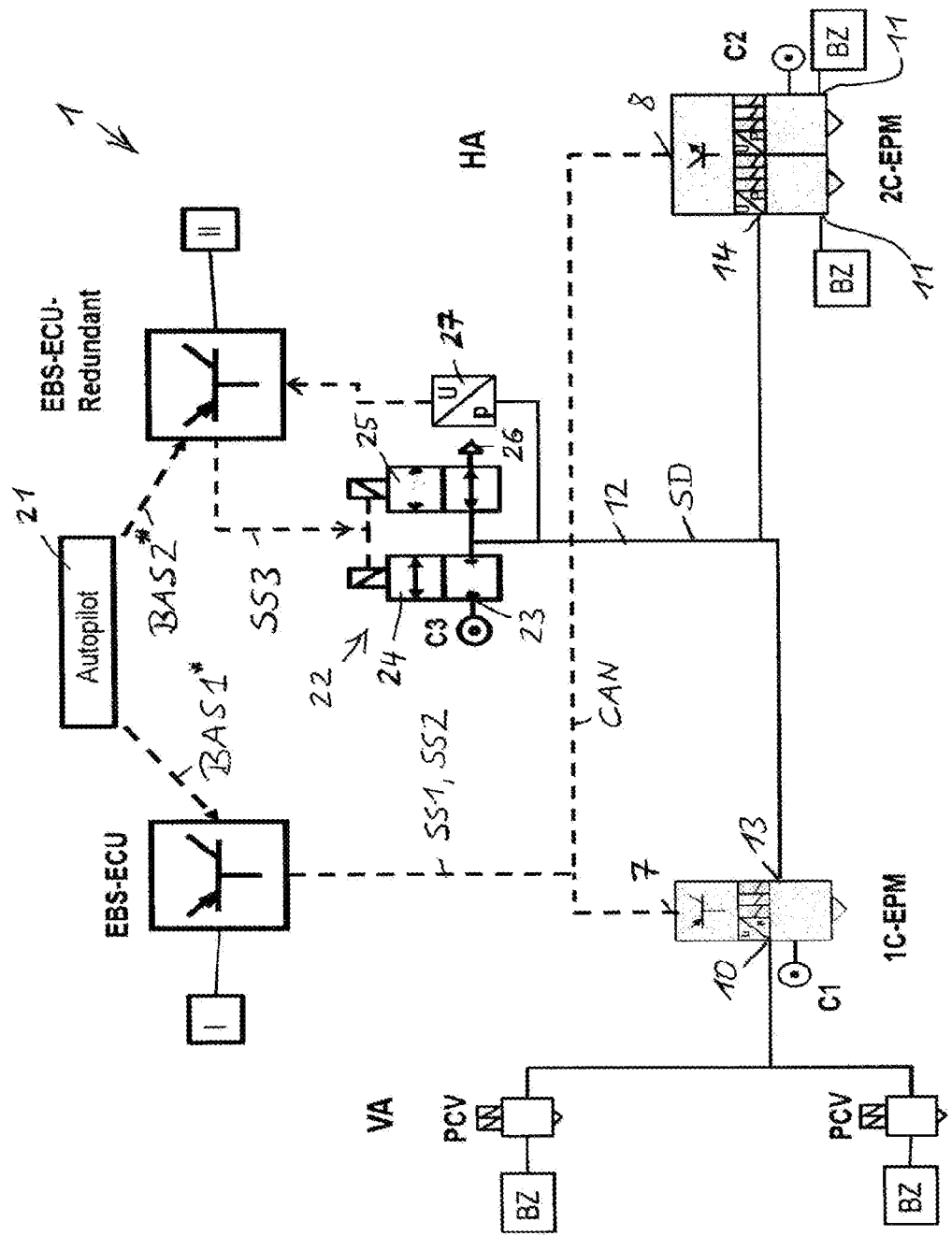
FIG. 3 illustrates a schematic diagram of an electronically controlled pneumatic operating brake system of a commercial vehicle according to a third embodiment of the invention.
Figure 4:
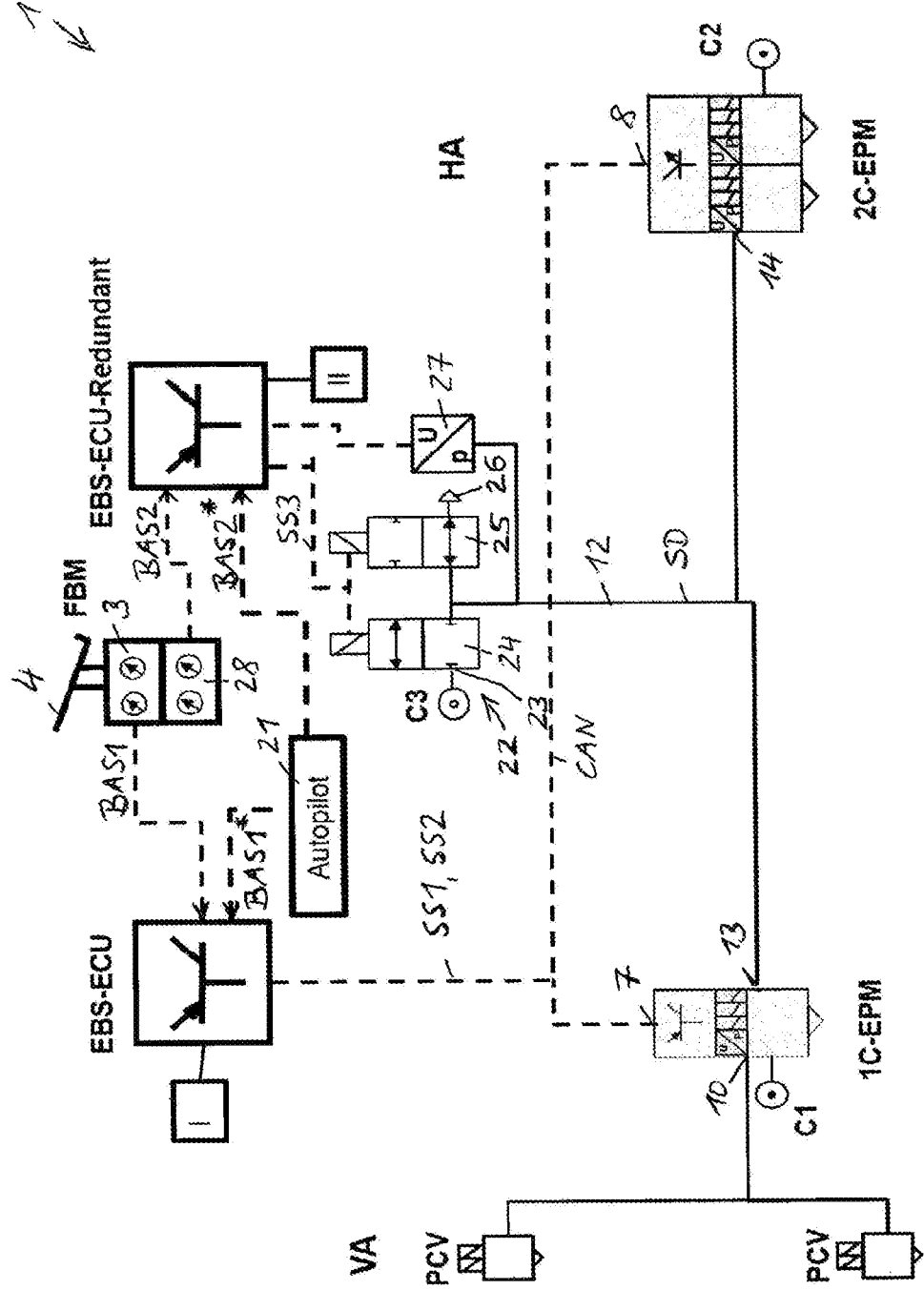
FIG. 4 illustrates a schematic diagram of an electronically controlled pneumatic operating brake system of a commercial vehicle according to a fourth embodiment of the invention.

In the additional embodiments illustrated in FIGS. 2-4, identical, like or equivalent elements and components are designated with the same reference numerals as in FIG. 1.

Differently from FIG. 1, the embodiment according to FIG. 2 has a supply connection 16 and thus a pneumatic channel 2 of the foot brake module FBM that is connected to the output 18 of a switch valve (select-high-valve) 17 whose first input 19 is connected to the first compressed air supply C1 and whose second input 20 is connected to the second compressed air supply C2. The switch valve 17 switches a respectively larger supply pressure at its two inputs, thus either the first supply pressure of the first compressed air supply C1 or the second supply pressure of the second compressed air supply C2 to an output 18 of the switch valve 17 and thus to the supply connection 16 and into the pneumatic channel 2 of the foot brake module FBM.

Therefore, if one of the compressed air supply C1 or C2 or a supply conduit connected to the respective compressed air supplies C1 or C2 has a leak when using the redundant pneumatic control of the operating brake system 1, the switch valve 17 conducts the supply pressure from the first compressed air supply C1 or from the second compressed air supply C2 not affected by the leak into the pneumatic channel 2 of the foot brake module FBM so that the common pneumatic control pressure can be generated in the foot brake module FBM.

Thus, the embodiments of FIG. 1 and FIG. 2 include pneumatic control signal generation devices configured to control the common pneumatic control pressure SD, wherein the pneumatic control signal generation devices include the (only) pneumatic channel 2 of the foot brake module FBM.

In the embodiments of FIGS. 1 and 2, the nominal vehicle deceleration is predetermined by an actuation of the foot brake pedal 4 of the foot brake module FBM by the driver, which is not the case anymore in the embodiment according to FIG. 3 since it does not include a foot brake module FBM like e.g. in a level 5 vehicle that is braked autonomously. In this case the nominal vehicle deceleration is predetermined by an auto pilot device.

On the other hand side, FIG. 3 also relates to the case where a foot brake module like in FIGS. 1 and 2 is provided, but not illustrated in FIG. 3, and the nominal vehicle deceleration is automatically predetermined by a driver assist system like e.g. an emergency brake assistant as a function of driving conditions like e.g. the distance or the relative velocity with respect to a preceding vehicle. Then an electronic control of the driver assist system predetermines the nominal vehicle deceleration.

When the auto pilot device is provided an electronic auto pilot control unit 21, puts out the first electrical brake request BAS1 which represents nominal vehicle deceleration to the first electronic control EBS-ECU which then generates the first and second electrical control signals SS1, SS2 SST for the pressure regulation modules 1C-EPM, 2C-EPM and optionally also for the trailer control module TCM. The electronic autopilot control device 21 is supplied with electrical energy by the first electrical energy supply I and/or by a second electrical energy supply II that is redundant from the first electrical energy supply I.

On the other hand side the electronic operating brake system additionally includes second control electronics EBS-ECU-redundant that form redundant control electronics of the EBS, this means a redundant brake control unit. The electronic autopilot control unit 21 then feeds a second brake request signal BAS2* into the redundant EBS-ECU-redundant, wherein the second brake request signal like the first brake request signal BAS 1* put out by the auto pilot control unit 21, also represents the nominal vehicle deceleration which is generated e.g. in routines of the auto pilot control unit 21 as function of driving conditions.

Based on the first brake request signal BAS1*, the first control electronics EBS-ECU then generate the first and second electrical control signals SS1 and SS2 and optionally also the electrical trailer control signal SST when a trailer control module TCM is provided, like in the embodiments of FIG. 1 and FIG. 2.

The functionality of the redundant second control electronics EBS-ECU-redundant can then have e.g. an identical scope as the functionality of the first control electronics EBS-ECU or it can also have a smaller scope. The second control electronics EBS-ECU-redundant then feed a third electrical control signal SS3, into a magnet valve device 22 as a function of the second electrical brake request signal BAS2* wherein the magnet valve device 22 is connected e.g. with its supply connection 23 to the third compressed air supply C3.

Alternatively, the supply connection 23 can also be connected to an output 18 of a switch valve as illustrated in FIG. 2, wherein the switch valve is then connected through its first input to the first compressed air supply C1 and through its second input 20 with the second compressed air supply C2, so that a respectively greater supply pressure of the first supply pressure and the second supply pressure is switched to the output 18.

The third electrical control signal SS3 represents a nominal value for the common pneumatic control pressure SD that is fed through the pneumatic conduit 12 into the first and second pneumatic control input 13, 14 of the pressure control modules 1C-EPM, 2C-EPM. Optionally, a trailer control module TCM like in the embodiment of FIGS. 1 and 2 can also be provided in the embodiment of FIG. 3 and connected with its third pneumatic control input 15 to the pneumatic conductor 12, which is then also controlled by the common pneumatic control pressure SD.

The magnet valve device 22 includes an inlet valve 24 and an outlet valve 25 which are respectively configured e.g. as two-two-way magnet valves with a pass-through position and a cut off position. As illustrated in FIG. 3, the inlet valve 24 is connected with an inlet side to the supply connection 23 and with an outlet side to the pneumatic conductor 12 that runs to the pneumatic control inputs 13, 14 and 15 of the pressure regulation modules 1C-EPM, 2C-EPM and the trailer control module TCM and then pneumatically controls these components. On the other hand side, the outlet valve is connected on the input side with the pneumatic conduit 12 and on the outlet side with a suction device 26.

In order to vent the pneumatic conduit 12 in order to pneumatically apply the operating brake cylinders BZ in a pneumatically redundant manner the inlet valve 24 is switched into its pass-through position by the second electronic control EBS-ECU-redundant so that compressed air can be fed into the pneumatic conduit 12 from the third compressed air supply 03 as a common pneumatic control pressure SD. In this case the outlet valve 25, is switched into its cut off position.

In order to bleed the pneumatic conduit for pneumatically redundant disengagement of the operating brake cylinders BZ, the outlet valve 25 is switched into its pass-through position so that compressed air can be conducted from the pneumatic conduit to the suction device 26 in order to reduce the common pneumatic control pressure. In this case the inlet valve 24 is controlled into its blocking position so that compressed air cannot escape from the third compressed air supply C3.

The inlet valve 24 and the outlet valve 25 can be switched from the cut off position into the pass-through position and vice versa by the second control electronics EBS-ECU-redundant also by pulse width modulation in order to be able to adjust a size of the common pneumatic control pressure SD in short time intervals.

In order to regulate the common pneumatic control pressure SD a pressure sensor 27 can be provided which feeds an actual value for the common pneumatic control pressure into the second electronic control EBS-ECU-redundant which then regulates the actual value to the nominal value of the common pneumatic control pressure SD that is predetermined by the third electric control signal SS3.

Therefore, the control signal generation devices for generating the common pneumatic control pressure SD are configured electro-pneumatic in the embodiment of FIG. 3 and include the second electronic control EBS-ECU-redundant, the magnet valve device 22 and the pressure sensor 27 and optionally also the implemented regulation of the common pneumatic control pressure SD. Alternatively, the pressure sensor 27 and the regulation can be omitted and replaced by a simple control of the common pneumatic control pressure SD.

The combination of second electronic control EBS-ECU-redundant and magnet valve device 22 as components of the electro pneumatic control signal generation devices provides electro pneumatic redundancy when the electro pneumatic control of the first operating brake system 1 through the first electronic control EBS-ECU has failed and the electro pneumatic control of the operating brake system 1 is provided by the second electronic control EBS-ECU-redundant and the magnet valve device 22.

Additionally, an additional pneumatic redundancy is provided by the third compressed air supply C3 of the third compressed air consumer circuit at the supply connection 23 of the magnet valve device 22 when a supply by the first compressed air supply C1 and/or the second compressed air supply C2 fails. Then a generation of the common pneumatic control pressure SD on a basis of the third supply pressure in the third compressed air supply C3 is assured as a function of a respective vehicle deceleration.

Advantageously the second electronic control EBS-ECU-redundant is supplied with electrical energy by a second electrical energy supply II that is independent from the first electrical energy supply I so that even a failure of the first electrical energy supply I has no effect upon braking ability of the commercial vehicle.

In the embodiment according to FIG. 4, the nominal vehicle deceleration is predetermined as a function of an actuation of the foot brake pedal 4 of the foot brake module FBM and/or by the electronic auto pilot control unit 21 depending on which of the respective values for the vehicle deceleration is greater. Put differently the embodiment of FIG. 4 includes a case where only the driver predetermines the nominal vehicle deceleration by actuating the foot brake pedal without the electronic auto pilot control device 21 predetermining a nominal vehicle deceleration because e.g. the auto pilot device is not activated. Furthermore, the electronic auto pilot control unit can predetermine the nominal vehicle deceleration by itself, e.g. when the commercial vehicle is controlled completely autonomously and the driver does not interfere. However, it is also possible that the driver predetermines an absolute value for the nominal vehicle deceleration by actuating the foot brake pedal and the electronic auto pilot control unit 21 also predetermines an absolute value for the nominal vehicle deceleration wherein the respectively greater absolute value is processed further as the nominal vehicle deceleration.

In the foot brake module FBM used herein a second electrical channel 28 is provided in addition to the first electrical channel 3 which generates the first electrical brake request signal BAS1 for the first electronic control EBS-ECU like in FIG. 1 and FIG. 2, wherein the second electrical channel 28 generates a second electrical brake request signal BAS2 for the second electronic control EBS-ECU-redundant.

Then the first electrical channel of the foot brake module FBM and/or the auto pilot control unit 21 can generate a first brake request signal BAS1 or BAS1* and feed the first brake request signal into the first control electronics EBS-ECU. The second electrical channel of the foot brake module FBM and/or the electronic autopilot control unit 21 can generate a second brake request signal BAS2 or BAS2*. A subsequent processing of the brake request signals BAS1 or BAS1* and BAS2 or BAS2* that may be generated in parallel is determined in particular by the fact which of the brake request signals BAS1 and BAS1* or BAS2 or BAS2* represents a greater nominal vehicle deceleration.

The first and second electrical control signal SS1, SS2 for the two control valves 1C-EPM and 2C-EPM is generated in the first electronic control EBS-ECU as a function of the respective first electrical brake request signal BAS 1 or BAS 1*. By the same token, the third electrical control signal SS3 for the magnet valve device 22 is generated in the second electronic control EBS-ECU-redundant as a function of the respectively used second electronic brake request signal BAS 2 or BAS 2 *. The embodiment of FIG. 4 therefore includes the same pneumatic control signal generation devices, like FIG. 3 which then receive the second electrical brake request signal BAS2, not from the auto pilot control device 21, but from the second electrical channel 28 of the foot brake module FBM.

The supply connection 23 of the magnet valve device 22 or of the electro pneumatic signal generation device is in turn connected in this embodiment to the third compressed air supply C3 so that additional pneumatic redundancy is also provided in this embodiment when a supply through the first compressed air supply C1 and/or through the second compressed air supply C2 fails.

Additionally, the first electronic control EBS-ECU and the first electronic channel 3 of the foot brake module FBM is supplied with electrical energy by the first electrical energy supply I and the second electronic control EBS-ECU-redundant, and the second electrical channel 28 of the foot brake module FBM is supplied with electrical energy by the second electrical energy supply II in order to provide electrical supply redundancy.

Merely the pressure regulation modules 1C-EPM, 2C-EPM and the trailer control module TCM are designated supra as electro pneumatically controllable control valves. However, it is appreciated that any electro pneumatical control valve like e.g. electrically and pneumatically controllable relay valves can be used as control valves according to the invention.

It is appreciated that the embodiments according to FIGS. 3 and 4 can also include an electrically and pneumatically controlled trailer control module TCM, like in the embodiments of FIGS. 1 and 2.

REFERENCE NUMERALS AND DESIGNATIONS 1 operating brake system
2 pneumatic channel
3 first electric channel
4 foot brake pedal
5 signal conductor
6 first electrical input
7 first electrical control input
8 second electrical control input
9 third electrical control input
10 first pneumatic operating output
11 second pneumatic operating output
12 pneumatic conduit
13 first pneumatic control input
14 second pneumatic control input
15 third pneumatic control input
16 supply connection
17 switch valve
18 output
19 first input
20 second input
21 autopilot control unit
22 magnet valve device
23 supply connection
24 inlet valve
25 outlet valve
26 suction device
27 pressure sensor
28 second electric channel
C1 first compressed air supply
C2 second compressed air supply
C3 third compressed air supply
EBS-ECU first electronic control
EBS-ECU-Redundant second electronic control
BAS1, BAS1* first electrical brake request signal
BAS2, BAS2* second electrical brake request signal
SS1 first electrical control signal
SS2 second electrical control signal
SST trailer control signal
SS3 third electrical control signal
1C-EPM first control valve (1-channel pressure regulation module)
2C-EPM second control valve (2-channel pressure regulation module)
PCV ABS pressure control valve
TCM trailer control module
FBM foot brake module
EBS electronically controlled operating brake system
CAN Brake-CAN
I first electrical energy supply
II second electrical energy supply
SD first pneumatic control pressure, second pneumatic control pressure, common pneumatic control pressure

What is claimed is:

1. An electronically controlled pneumatic operating brake system, comprising:
a first electronic control;
a first brake circuit including a first compressed air supply and a first control valve;
a second brake circuit including a second compressed air supply independent from the first compressed air supply and a second control valve, wherein the first brake circuit is supplied with compressed air from the first compressed air supply and the second brake circuit is supplied with compressed air from the second compressed air supply,
wherein at least one first brake pressure is controllable by the first control valve at at least one first pneumatic operating output of the first control valve in the first brake circuit based on compressed air from the first compressed air supply, and at least one second brake pressure is controllable by the second control valve at at least one second pneumatic operating output of the second control valve in the second brake circuit based on compressed air from the second compressed air supply, wherein at least one pneumatic operating brake actuator of the first brake circuit is connected at the at least one first pneumatic operating output and at least one pneumatic operating brake actuator of the second brake circuit is connected at the at least one second pneumatic operating output,
wherein the first control valve includes a first electrical control input configured to receive a first electrical control signal and a first pneumatic control input configured to receive a first pneumatic control pressure (SD) and the second control valve includes a second electrical control input configured to receive a second electrical control signal and a second pneumatic control input configured to receive a second pneumatic control pressure (SD),
wherein the first electronic control generates the first electrical control signal as a function of a nominal vehicle deceleration and feeds the first electrical control signal to the first electrical control input of the first control valve and generates the second electrical control signal and feeds the second electrical control signal to the second electrical control input of the second control valve,
wherein control signal generation devices are provided that generate the first pneumatic control pressure (SD) as a function of the nominal vehicle deceleration and feed the first pneumatic control pressure (SD) to the first pneumatic control input of the first control valve and generate the second pneumatic control pressure (SD) and feed the second pneumatic control pressure to the second pneumatic control input of the second control valve;
a third compressed air consumer circuit that is independent from the first brake circuit and the second brake circuit and supplied with compressed air by a third compressed air supply that is independent from the first compressed air supply and the second compressed air supply,
wherein a pneumatic supply connection of the control signal generation devices is supplied with compressed air by a greater supply pressure of a first supply pressure in the first compressed air supply and a second supply pressure in the second compressed air supply, or is supplied with compressed air by a third supply pressure of the third compressed air supply, and
wherein the control signal generation devices are configured to generate the first pneumatic control pressure (SD) and feed the first pneumatic control pressure to the first pneumatic control input and generate the second pneumatic control pressure (SD) and feed the second pneumatic control pressure to the second pneumatic control input based on the first supply pressure, the second supply pressure or the third supply pressure provided to the supply connection of the control signal generation devices.

2. The electronically controlled pneumatic operating brake system according to claim 1, wherein the nominal vehicle deceleration is predetermined by an actuation of a foot brake pedal of a foot brake module or by an autopilot device or by a driver assist system.

3. The electronically controlled pneumatic operating brake system according to claim 2,
wherein the foot brake module includes a first electrical channel, and
wherein a first electrical brake request signal (BAS1) is generated in the first electrical channel as a function of the actuation of the foot brake pedal and fed to the first electronic control which generates the first electrical control signal as a function of the first brake request signal (BAS1) and feeds the first electrical control signal to the first electrical control input and generates the second electrical control signal and feeds the second electrical control signal to the second electrical control input.

4. The electronically controlled pneumatic operating brake system according to claim 3,
wherein the foot brake module includes a second electrical channel, and
wherein a second electrical brake request signal (BAS2) is generated in the second electrical channel as a function of the actuation of the foot brake pedal.

5. The electronically controlled pneumatic operating brake system according to claim 4,
wherein the control signal generation devices include a magnet valve device and a second electronic control, and
wherein the second electronic control generates a third electrical control signal as a function of the second electrical brake request signal (BAS2) or as a function of a second brake request signal (BAS2*) and feeds the third electrical control signal to the magnet valve device which generates the first pneumatic control pressure (SD) as a function of the third electrical control signal and feeds the first pneumatic control pressure (SD) to the first pneumatic control input and generates the second pneumatic control pressure (SD) and feeds the second pneumatic control pressure (SD) to the second pneumatic control input.

6. The electronically controlled pneumatic operating brake system according to claim 5, wherein the first electronic control is supplied with electrical energy by a first electrical energy supply which is independent from a second electrical energy supply that supplies the second electronic control with electrical energy.

7. The electronically controlled pneumatic operating brake system according to claim 6, wherein the second electronic control provides redundancy for the first electronic control when the first electronic control or the first electrical energy supply of the first electronic control malfunctions or fails and the at least one first brake pressure is generated as a function of the first pneumatic control pressure (SD) and the at least one second brake pressure is generated as a function of the second pneumatic control (SD).

8. The electronically controlled pneumatic operating brake system according to claim 5, wherein the magnet valve device is supplied with compressed air by the supply connection and includes an inlet/-outlet magnet valve combination configured to increase, maintain or decrease the first pneumatic control pressure (SD) and the second pneumatic control pressure (SD) as a function of the third electrical control signal.

9. The electronically controlled pneumatic operating brake system according to claim 5,
wherein the signal generation devices include at least one pressure sensor that transmits the first pneumatic control pressure (SD) put out by the magnet valve device or an actual pressure value corresponding to the second pneumatic control pressure (SD) to the second electronic control, and
wherein the second electronic control controls the magnet valve device in a closed control loop so that the actual pressure value is regulated to match a nominal pressure value which is a function of the second electrical brake request signal (BAS2).

10. The electronically controlled pneumatic operating brake system according to claim 3, wherein the foot brake module includes a pneumatic channel or exactly one pneumatic channel that is included in the signal generation devices and supplied with compressed air by the pneumatic supply connection and that generates the first pneumatic control pressure (SD) as a function of the actuation of the foot brake pedal and feeds the first pneumatic control pressure (SD) to the first pneumatic control input and generates the second pneumatic control pressure (SD) and feeds the second pneumatic control pressure (SD) to the second pneumatic control input.

11. The electronically controlled pneumatic operating brake system according to claim 2,
wherein the autopilot device or the driver assist system generates a first electrical brake request signal (BAS1*) as a function of the nominal vehicle deceleration and feeds the first electrical brake request signal (BAS1*) to the first electronic control which generates the first electrical control signal as a function of the first electrical brake request signal (BAS1*) and feeds the first electrical control signal to the first electrical control input and generates the second electrical control signal and feeds the second electrical control signal to the second electrical control input and generates a second electrical brake request signal (BAS2*).

12. The electronically controlled pneumatic operating brake system according to claim 1, wherein selection devices are provided which feed a larger respective pressure of the first supply pressure and the second supply pressure to the pneumatic supply connection of the signal generation devices.

13. The electronically controlled pneumatic operating brake system according to claim 12,
wherein the selection devices include a pneumatic switch valve, and
wherein a first input of the pneumatic switch valve is connected to the first compressed air supply and a second input of the pneumatic switch valve is connected to the second compressed air supply and an output of the pneumatic switch valve is connected to the supply connection of the signal generation devices.

14. The electronically controlled pneumatic operating brake system according to claim 1,
wherein the control signal devices are configured to feed the first pneumatic control pressure (SD) or the second pneumatic control pressure (SD) to a third pneumatic control input of an electropneumatic trailer control module to control brakes of a trailer,
wherein the trailer control module is electrically controlled by a third electrical control signal of the first electronic control, and
wherein the third electrical control signal represents a nominal value for a trailer brake pressure.

15. The electronically controlled pneumatic operating brake system according to claim 14, wherein the first electrical control signal represents a first nominal value for the first brake pressure and the second electrical control signal represents a second nominal value for the second brake pressure.

16. The electronically controlled pneumatic operating brake system according to claim 1,
wherein the first control valve or the second control valve includes a one channel pressure regulation module or a two channel pressure regulation module, each channel including a relay valve, an inlet-/outlet magnet valve combination that pneumatically pilot controls the relay valve, an electronic control unit connected to the first electrical control input or the second electrical control input,
wherein the electronic control unit electrically controls the inlet-/outlet valve combination as a function of the first electrical control signal or the second electrical control signal to generate a pneumatic pilot pressure for the relay valve,
wherein the relay valve generates an actual value for the first brake pressure or the second brake pressure as a function of the pneumatic pilot pressure, and
at least one pressure sensor that transmits the actual value to the electronic control unit so that the electronic control unit controls the inlet-/outlet magnet valve combination electrically to match the actual value to the nominal value, and
a backup magnet valve electrically controlled by the electronic control unit,
wherein the backup magnet valve provides a connection between the first pneumatic control input and the at least one first pneumatic operating output or between the second pneumatic control input and the at least one second pneumatic operating output when the magnet valve is without electrical current and blocks the connection when the magnet valve is provided with current.

17. The electronically controlled pneumatic operating brake system according to claim 1, wherein the first brake circuit is a front axle brake circuit and the second brake circuit is a rear axle brake circuit.

18. The electronically controlled pneumatic operating brake system according to claim 1, wherein the at least one first operating output of the first control valve is connected with at least one first pneumatic operating brake cylinder and the at least one second operating output of the second control valve is connected with at least one second pneumatic operating brake cylinder.

19. The electronically controlled pneumatic operating brake system according to claim 1, wherein the third compressed air consumer circuit is an auxiliary consumer circuit or a trailer consumer circuit.

20. The electronically controlled pneumatic operating brake system according to claim 1, wherein the control signal generation devices are configured to generate and control the first pneumatic control pressure and the second pneumatic control pressure as a common pneumatic control pressure (SD).

21. The electronically controlled pneumatic operating brake system according to claim 1, further comprising an electronically controlled operating brake system with brake pressure regulation (EBS).

* * * * *